(12) United States Patent
Li et al.

(10) Patent No.: US 7,663,359 B2
(45) Date of Patent: Feb. 16, 2010

(54) TESTING MECHANISM FOR CASINGS

(75) Inventors: Lei Li, Shenzhen (CN); Ping Chen, Shenzhen (CN); Wen-Quan Xu, Shenzhen (CN); Zhi Cheng, Shenzhen (CN); Chang-Fa Sun, Shenzhen (CN); Xue-Liang Zhai, Shenzhen (CN); Lin-Sen Dong, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 316 days.

(21) Appl. No.: 11/682,764

(22) Filed: Mar. 6, 2007

(65) Prior Publication Data

US 2007/0294899 A1 Dec. 27, 2007

(30) Foreign Application Priority Data

Jun. 21, 2006 (CN) .......................... 2006 1 0061244

(51) Int. Cl.
 *G01R 31/28* (2006.01)
(52) U.S. Cl. .................................. 324/158.1
(58) Field of Classification Search ................. 324/765, 324/769, 158.1, 755, 758; 257/48; 438/14–18
 See application file for complete search history.

(56) References Cited

U.S. PATENT DOCUMENTS

| | | | |
|---|---|---|---|
| 5,500,605 A | * | 3/1996 | Chang ......................... 324/758 |
| 6,359,452 B1 | * | 3/2002 | Mozzetta ..................... 324/754 |

FOREIGN PATENT DOCUMENTS

CN 2718583 Y 8/2005

* cited by examiner

*Primary Examiner*—Ha Tran T Nguyen
*Assistant Examiner*—Tung X Nguyen
(74) *Attorney, Agent, or Firm*—Steven M. Reiss

(57) ABSTRACT

An exemplary testing mechanism (100) is used for testing for a sufficiency of a casing 90. The testing mechanism includes a framework (20) and a testing module (40). The framework includes a base board (21) and a pillar (26). One end of the pillar is mounted on the base board. The testing module includes a main board (42) and at least one testing pin (44). The main board is slidably mounted on the pillar. A bottom end of the testing pin is slidably mounted to the main board. A top end of the testing pin is positioned adjacent to the base board of the framework. The at least one testing pin is located in a position corresponding to at least one mounting hole of a sufficient casing.

15 Claims, 8 Drawing Sheets

US 7,663,359 B2

TESTING MECHANISM FOR CASINGS

BACKGROUND OF THE INVENTION

1. Field of the Invention

The present invention generally relates to testing mechanisms for casings and, more particularly, to a testing mechanism configured (i.e., structured and arranged) for testing a casing with a plurality of mounting holes for mounting other casings on the casing.

2. Description of Related Art

With the development of wireless communication and information processing technologies, portable electronic devices, such as mobile phones, are now in widespread use. These electronic devices enable consumers to enjoy high-tech services anytime and anywhere. A typical electronic device has an upper casing and a lower casing mounted together to accommodate electronic devices therein. The upper casings and the lower casings may, advantageously, be mounted together by means of engagement between mounting holes and bolts. In assembly, therefore, it is important to ensure a proper engagement between each mounting hole of the upper casing and each corresponding mounting hole of the lower casing. Even though the upper casings and the lower casings are made in separate manufacturing lines, each mounting hole of the upper casing should be in a proper position for engagement with one corresponding mounting hole of the lower casing.

A three-dimensional image measuring machine can be used to test whether one casing is of sufficient quality. The casing to be tested is placed in front of a field lens of the machine. A CCD (charged coupled device) or CMOS (complementary metal-oxide-semiconductor) sensor of the machine can capture an image of the mounting holes of the casing and transfer the image data to an image processor. The processor can enlarge the image of the casing by about 30~225 times and then test whether it is of sufficient quality by comparing the captured image with an image of a casing of the desired quality. Finally, the machine displays the result to the user. However, this process is overly expensive.

Therefore, a new testing mechanism is desired in order to overcome the above-described shortcomings.

SUMMARY

In one embodiment thereof, a testing mechanism for testing for a sufficiency of a casing includes a framework and a testing module. The framework includes a base board and a pillar. One end of the pillar is mounted on the base board. The testing module includes a main board and at least one testing pin. The main board is slidably mounted on the pillar. A bottom end of the testing pin is slidably mounted to the main board. A top end of the testing pin is positioned adjacent to the base board of the framework. The at least one testing pin is located in a position corresponding to at least one mounting hole of a sufficient casing.

Other advantages and novel features of the embodiments will become more apparent from the following detailed description thereof when taken in conjunction with the accompanying drawings.

BRIEF DESCRIPTION OF THE DRAWINGS

Many aspects of the present testing mechanism can be better understood with reference to the following drawings. The components in the drawings are not necessarily drawn to scale, the emphasis instead being placed upon clearly illustrating the principles of the testing mechanism and its potential applications. Moreover, in the drawings, like reference numerals designate corresponding parts throughout the several views.

DETAILED DESCRIPTION OF THE EMBODIMENTS

Figure 1:
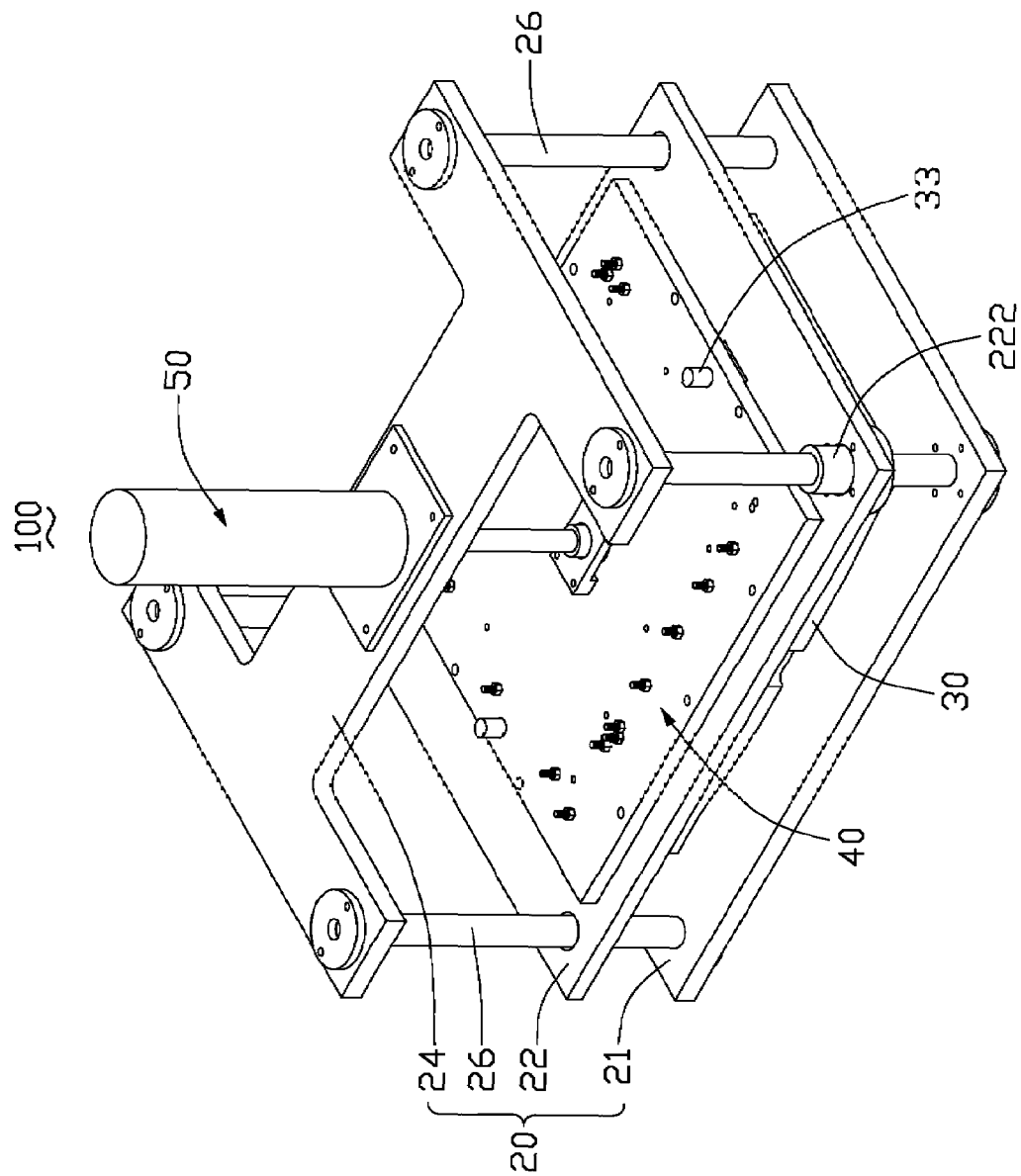
FIG. 1 is an assembled, isometric view of the present testing mechanism, in accordance with a preferred embodiment.
Figure 2:
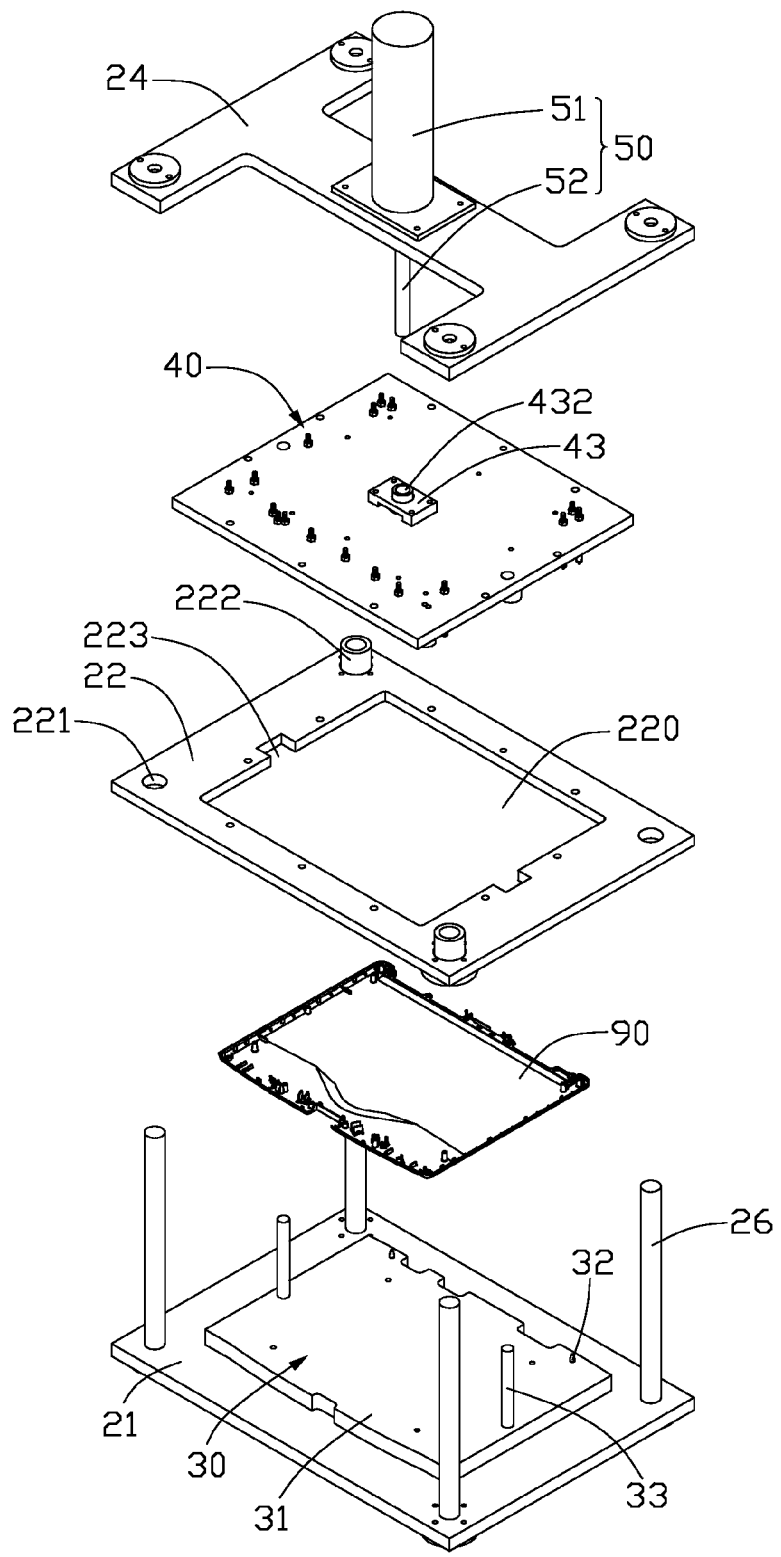
FIG. 2 is an exploded, isometric view of the testing mechanism with a casing to be tested.

Referring now to the drawings in detail, FIGS. 1-2 show a testing mechanism 100 of a preferred embodiment for testing a casing 90 of an electronic device. The casing 90 usually has a plurality of mounting protrusions 91 thereon. Such mounting protrusions 91 are configured for mounting other casings, such as another casing 90, on the casing 90. Each protrusion 91 defines a mounting hole 92 therein. The testing mechanism 100 is configured for testing whether the mounting holes 92 are in proper positions (i.e., proper alignment). The testing mechanism 100 includes a framework 20, a seat 30, a testing module 40, and a driving module 50. The seat 30, the testing module 40, and the driving module 50 are mounted to the framework 20, from bottom to top, in that order.

The framework 20 includes a base board 21, an adjusting board 22, a top board 24, and four pillars 26. The base board 21 and the adjusting board 22 are substantially plane boards, in shape. The adjusting board 22 defines an opening 220 in a center thereof, with holes 221 formed in each corner of the adjusting board 22, and two cutouts 223 defined in the adjusting board 22. The cutouts 223 communicate with the opening 220. Two of the holes 221 that lie along a diagonal line of the adjusting board 22 have a respective pair of sleeves 222 in communication therewith, each such sleeve 222 extending from and in connection with the adjusting board 22. The top board 24 is substantially I-shaped. One end of each pillar 26 is mounted on the base board 21. Each pillar 26 travels through one corresponding hole 221, thereby allowing the adjusting board 22 to be slidably mounted to the pillars 26. The other opposite end of each pillar 26 is mounted to the top board 24.

The seat 30 is substantially a plane board, in shape, and is mounted on the base board 21 of the framework 20. The seat 30 has a top surface 31 configured for supporting the casing 90 for testing. Two reference protrusions 32 extend directly and perpendicularly from the top surface 31 for positioning the casing 90. Two positioning poles 33 extend directly and perpendicularly from the top surface 31.

Figure 3:
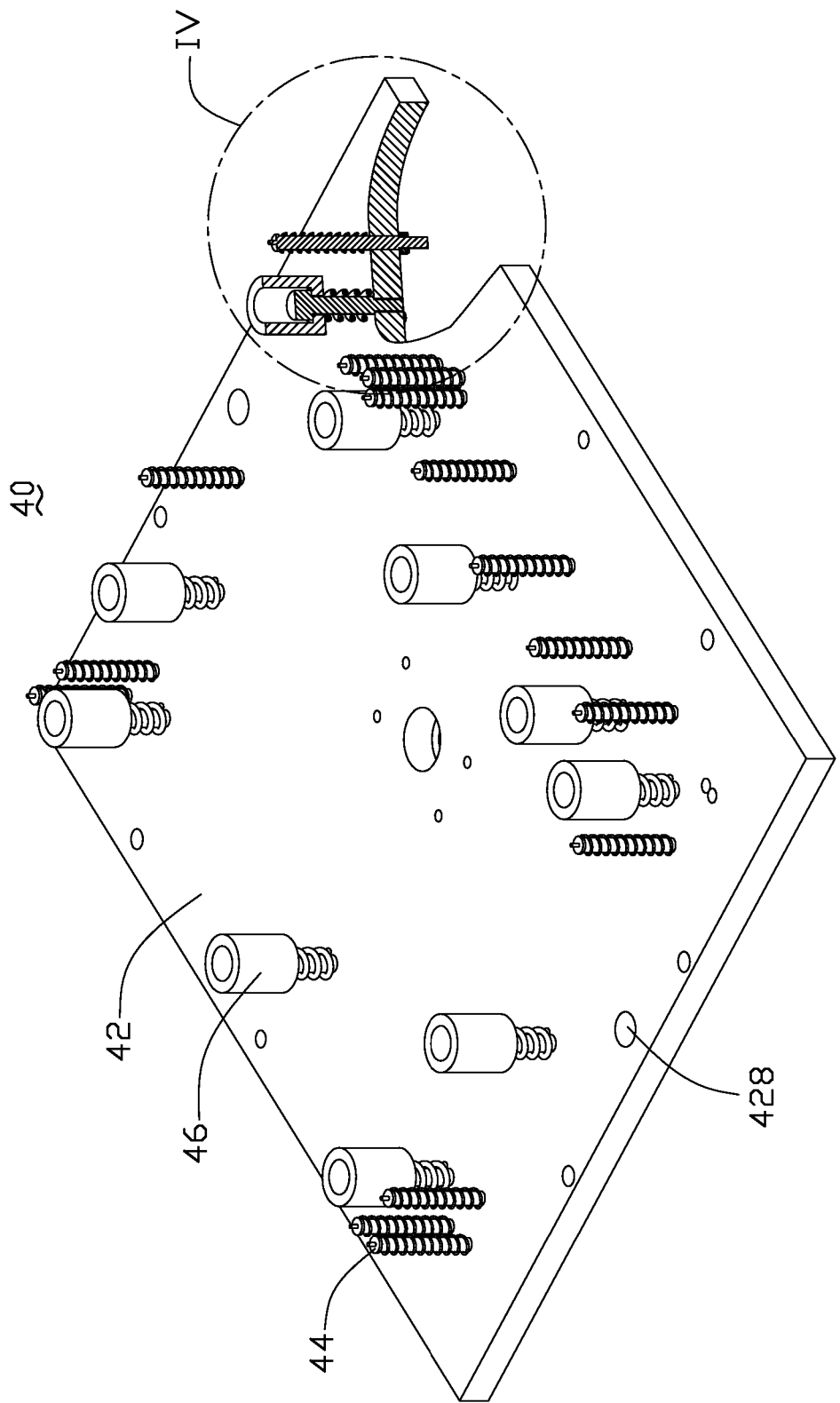
FIG. 3 is an enlarged, partially cut-away view of a testing module of the testing mechanism shown in FIG. 1.
Figure 4:
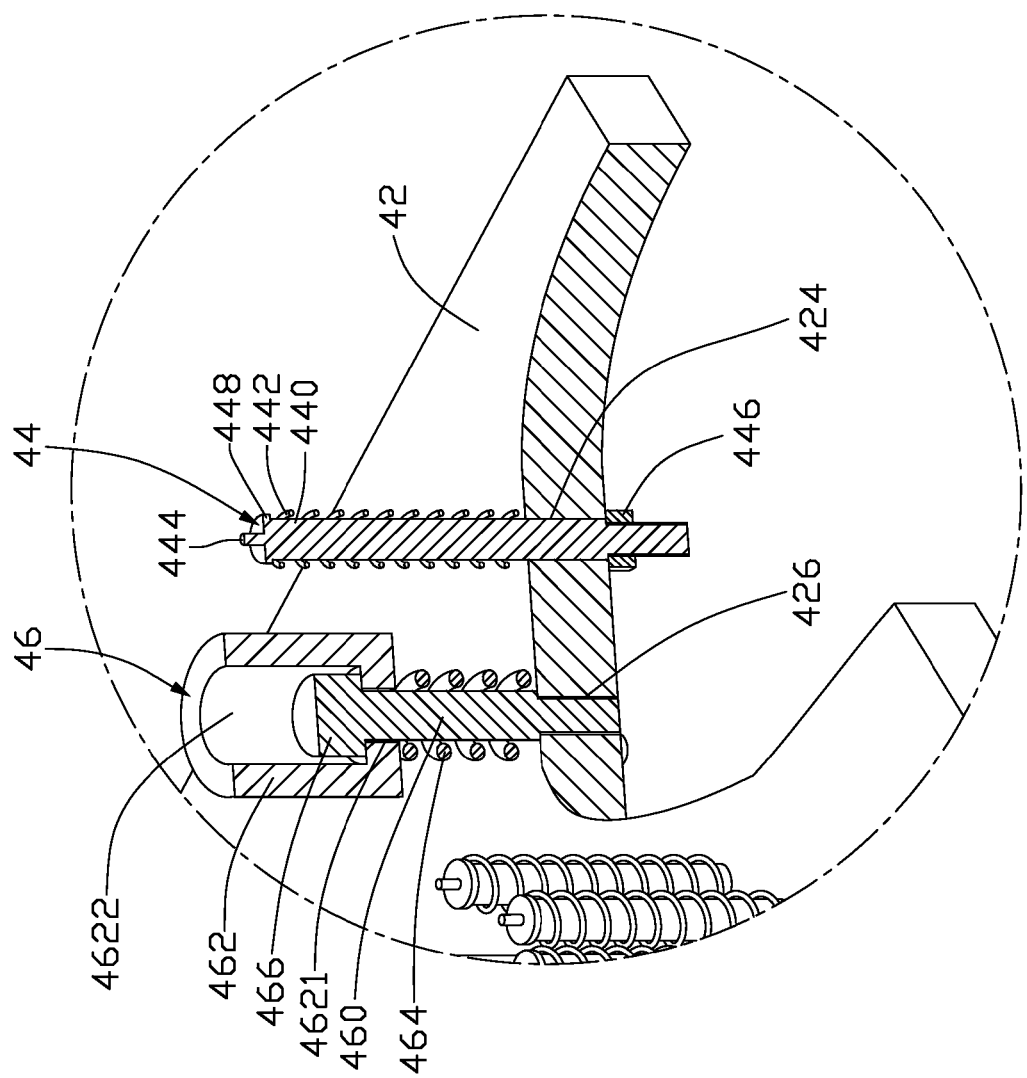
FIG. 4 is an enlarged view of area IV, shown in FIG. 3.

Referring to FIGS. 3-4, the testing module 40 includes a main board 42, a base block 43, a plurality of testing pins 44, and a plurality of positioning modules 46. The main board 42 is mounted on and in contact with the adjusting board 22 with the testing pins 44, and the positioning modules 46 are exposed out through the opening 220. The main board 42 defines a plurality of positioning holes 424, a plurality of screw holes 426, and two holes 428 therethrough. Each positioning pole 33 travels through one corresponding cutout 223 of the adjusting board 22 and one corresponding hole 428, thereby slidably mounting the main board 42 to the seat 30. The base block 43 is mounted on and in contact with a center of the main board 42. A cylindrical barrel 431 is directly mounted on the base block 43.

The testing pins 44 are configured to be positioned corresponding to the locations of the mounting holes 92 of the casing 90. Each testing pin 44 has a pin body 440 with a bottom end and an opposite top end. The bottom end of each testing pin 44 is slidably mounted in the positioning hole 424 of the main board 42 by a nut 446. A pointed projection 444 is formed on the top end of each testing pin 44. The pointed projection 444 is positioned adjacent to the top surface 31 of the seat 30 and is configured for being received in a mounting hole of a desired casing. A stopper 448 is directly mounted on the top end of each testing pin 44. The pointed projection 444 extends through the stopper 448. A diameter of the stopper 448 is larger than a diameter of the pin body 440. A first elastic member 442 is mounted around and, thus, adjacent a respective pin body 440 between the stopper 448 and the main board 42. The first elastic member 442 is compressed so that each nut 446 mounted on the bottom end of the pin body 440 abuts against the main board 42.

Each positioning module 46 includes a supporting pole 460, a positioning cylinder 462, a second elastic member 464, and a block 466. For a given positioning module 46, a bottom end of the supporting pole 460 is threadedly mounted in the screw hole 426 of the main board 42. The positioning cylinder 462 has one open end and one opposite half-closed end, thereby defining a through hole 4621. The positioning cylinder 462 defines a cavity 4622 in a center thereof. The cavity 4622 communicates with the through hole 4621. An opposite top end of the supporting pole 460 slidably travels through the through hole 4621. The block 466 is mounted in the cavity 4622 of the positioning cylinder 462 and is mounted directly on the top end of the supporting pole 460. The block 466 can slide relative to the positioning cylinder 462 yet cannot travel through the through hole 4621. The second elastic member 464 is mounted around and, thus, adjacent the supporting pole 460 between the positioning cylinder 462 and the main board 42. The second elastic member 464 is compressed, thereby holding the positioning cylinder 462 against the block 466. The first and second elastic members 442, 464 are preferably made of metal and are spiral-shaped (i.e., a coil spring).

The driving module 50 includes a motor 51 and a driving pole 52. The motor 51 is mounted against the top board 24 of the framework 20. One end of the driving pole 52 is mounted to and controlled by the motor 51. The other opposite end of the driving pole 52 is mounted directly to the cylindrical barrel 432 of the main board 42. The motor 51 is configured to drive the testing module 40 to slide along the pillars 26, relative to the seat 30, via the driving pole 52.

Figure 5:
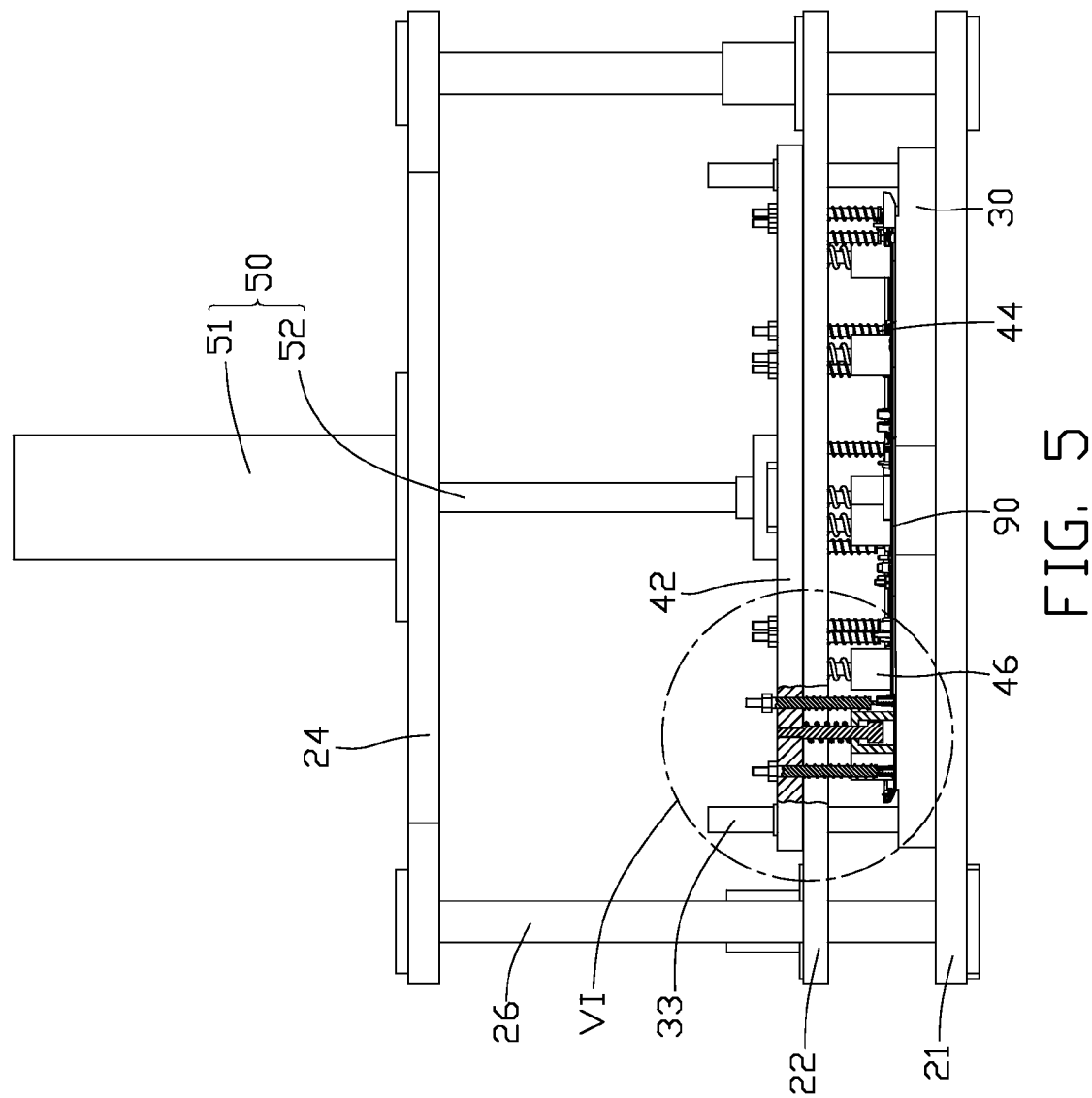
FIG. 5 is a partially cut-away view of the assembled testing mechanism and the casing, in accordance with the preferred embodiment.
Figure 6:
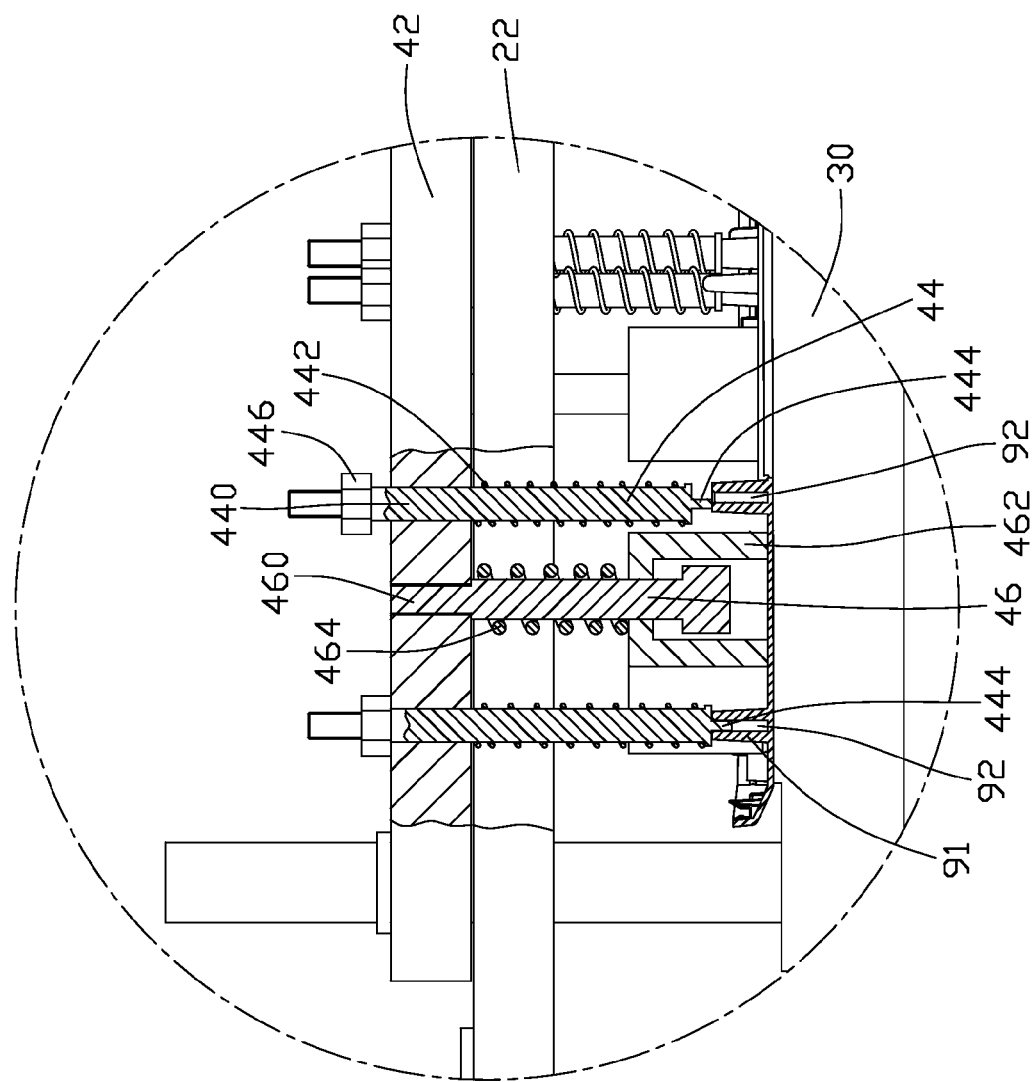
FIG. 6 is an enlarged view of area VI, shown in FIG. 5.

Before use, the nuts 446 abut against the main board 42. Referring to FIGS. 5-6, in use, the casing 90 is placed on the top surface 31 of the seat 30. The reference protrusions 32 and the positioning poles 33 cooperate to position the casing 90. The motor 51 drives the testing module 40 to move towards the casing 90 until the positioning cylinders 462 abut against the casing 90 and the pointed projections 444 move to the mounting protrusions 91 of the casing 90. The positioning cylinders 462 can further position the casing 90 in a vertical direction. If each pointed projection 444 is received in one corresponding mounting hole 92 and all the nuts 446 are in their original positions, the casing 90 is of sufficient quality. If at least one pointed projection 444 abuts against a top end of one corresponding mounting protrusion 91 and at least one nut 446 is moved away from the main board 42, then the casing 90 is of insufficient quality.

Figure 7:
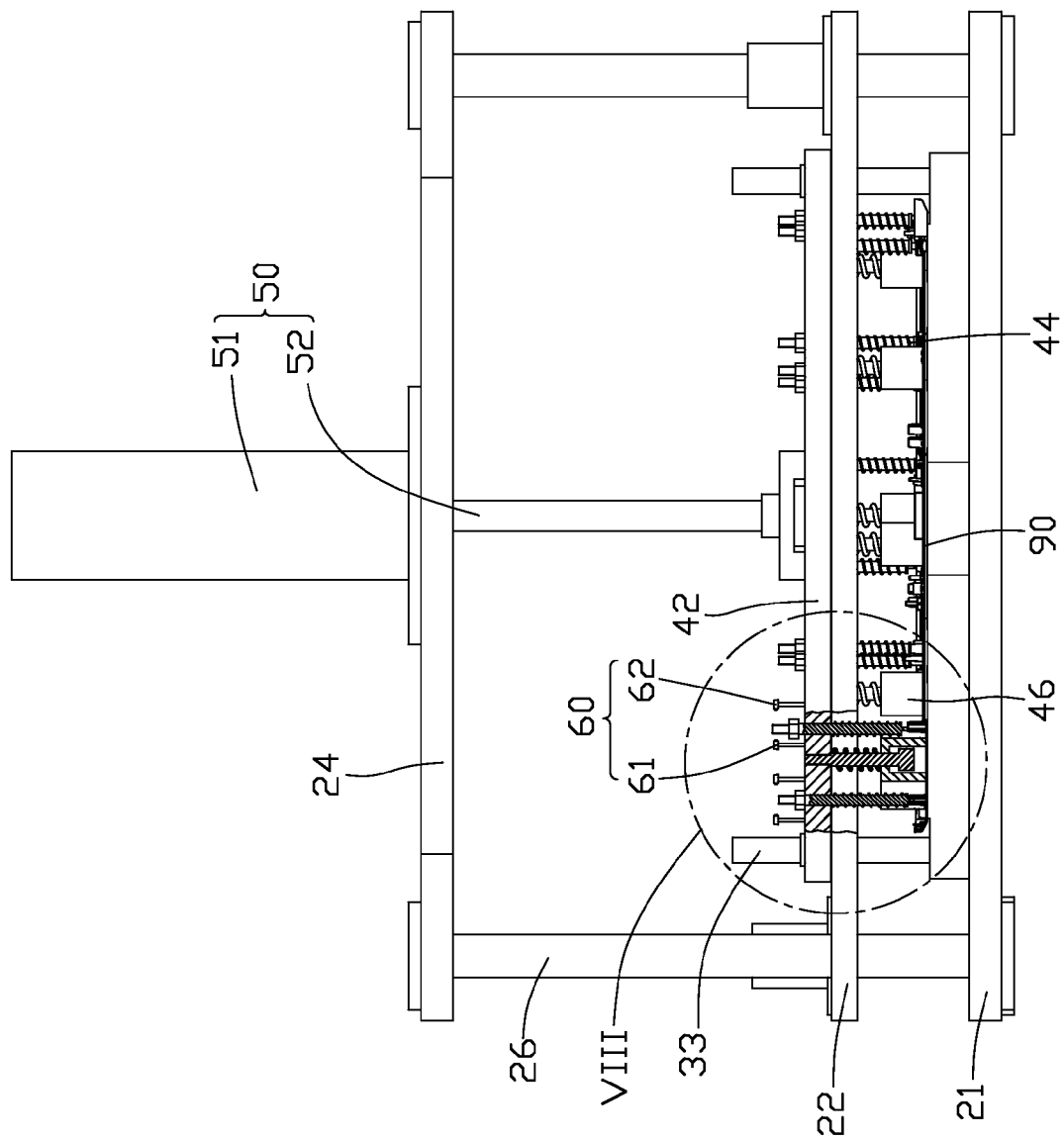
FIG. 7 is a partially cut-away view of the assembled testing mechanism and the casing, in accordance with an alternative embodiment.
Figure 8:
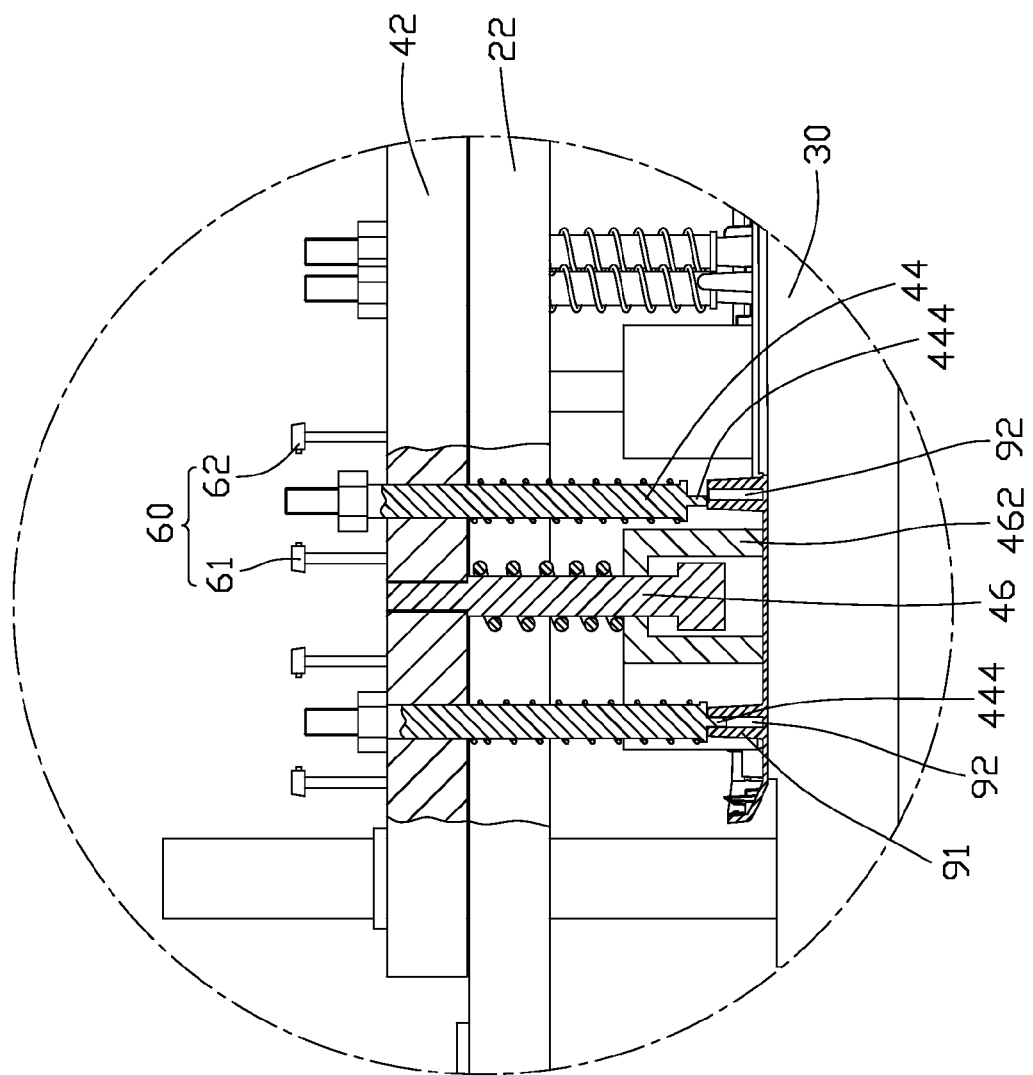
FIG. 8 is an enlarged view of area VIII, shown in FIG. 7.

Also referring to FIGS. 7-8, in an alternative embodiment, one infrared sensing module 60 may be used to detect whether there is one nut 446 being moved away from the main board 42. The infrared sensing module 60 includes a transmitter 61 and a receiver 62. The transmitter 61, the bottom end of one testing pin 44, and the receiver 62 are positioned along one line, in that order. When one nut 446 moves away from the main board 42, the bottom end of the testing pin 44 also moves away from the main board 42 and moves into the path of infrared rays transmitted by the transmitter 61 to the receiver 62. Then, the infrared sensing module 60 detects one nut 446 being moved away from the main board 42.

It should be understood that the adjusting board 22 of the framework 20 may be omitted. Correspondingly, the testing module 40 is directly mounted to the pillar 26 of the framework 20. The seat 30 may be omitted. Correspondingly, the reference protrusions 32 and the positioning poles 33 may be directly formed on the base board 21 of the framework 20, and the casing 90 to be tested is directly placed on the base board 21 of the framework 20. The first and second elastic members 442, 464 may alternatively have a different configuration, for example, a leaf spring or a resilient (e.g., elastomeric) cylinder. The positioning modules 46 of the testing module 40 may be omitted, and the casing 90 may be held only by the seat 30.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A testing mechanism for testing for a sufficiency of a casing, the testing mechanism comprising:
    a framework including a base board, a top board and a pillar, one end of the pillar being mounted on the base board, the top board being mounted on the other opposite end of the pillar;
    a testing module including a main board and at least one testing pin, the main board being slidably mounted on the pillar, a bottom end of the testing pin being slidably mounted on the main board, a top end of the testing pin being adjacent to the base board, and the at least one testing pin being located in a position corresponding to at least one mounting hole of a sufficient casing; and
    a driving module mounted on the top board and configured for driving the main board to slide relative to the base board.

2. The testing mechanism as claimed in claim 1, further comprising a seat, wherein the seat is mounted on the base board, the seat being used for supporting the casing to be tested.

3. The testing mechanism as claimed in claim 2, wherein the seat has two reference protrusions extending perpendicularly therefrom for positioning the casing.

4. The testing mechanism as claimed in claim 2, wherein the seat has two positioning poles extending perpendicularly therefrom, the main board of the testing module defines two holes therethrough, and each positioning pole travels through one corresponding hole of the main board, thereby allowing the main board to slide along the positioning poles.

5. The testing mechanism as claimed in claim 1, wherein the driving module includes a motor and a driving pole, the motor is mounted to the top board, one end of the driving pole is mounted to and controlled by the motor, and the other opposite end of the driving pole is mounted to the main board.

6. The testing mechanism as claimed in claim 5, wherein the testing module further comprises a base block mounted on the main board, and a cylindrical barrel is mounted on the base block and is configured for receiving the other opposite end of the driving pole.

7. The testing mechanism as claimed in claim 1, wherein the testing pin has a pointed projection formed on the top end thereof, and the pointed projection is configured for engaging with a mounting protrusion of the casing.

8. The testing mechanism as claimed in claim 7, wherein the testing module further comprises a stopper and a first elastic member, the stopper is mounted on the top end of the testing pin, the pointed projection extends through the stopper, and the first elastic member is mounted between the stopper and the main board.

9. The testing mechanism as claimed in claim 1, wherein the testing module further comprises at least one positioning module, the positioning module includes a supporting pole, a positioning cylinder, a second elastic member, and a block, a bottom end of the supporting pole is mounted to the main board, the positioning cylinder is mounted on an opposite top end of the supporting pole, the block is mounted in a cavity of the positioning cylinder and is mounted on the top end of the supporting pole, and the second elastic member is mounted between the positioning cylinder and the main board.

10. The testing mechanism as claimed in claim 1, wherein the framework further includes an adjusting board slidably mounted on the pillar and the testing module is mounted on the adjusting board.

11. A testing mechanism for testing for a sufficiency of a casing, the testing mechanism comprising:
a framework having a top surface configured for supporting the casing; and
a testing module including a main board, at least one testing pin, a stopper, and a first elastic member, the main board being slidably mounted to the framework, a bottom end of the testing pin being slidably mounted on the main board, a top end of the testing pin being adjacent to the top surface of the framework, and the at least one testing pin configured for receipt in at least one corresponding mounting hole of a sufficient casing, the testing pin having a pointed projection formed on the top end thereof, the stopper mounted on the top end of the testing pin, the pointed projection extending through the stopper, and the first elastic member mounted between the stopper and the main board.

12. The testing mechanism as claimed in claim 11, wherein the framework has two reference protrusions extending perpendicularly from the top surface thereof, the two reference protrusions being configured for positioning the casing.

13. The testing mechanism as claimed in claim 12, wherein the framework has two positioning poles extending perpendicularly from the top surface thereof the main board of the testing module defines two holes therethrough, and each positioning pole travels through one corresponding hole of the main board, thereby allowing the main board to slide along the positioning poles.

14. The testing mechanism as claimed in claim 11, wherein the testing module further comprises at least one positioning module, the positioning module includes a supporting pole, a positioning cylinder, a second elastic member, and a block, a bottom end of the supporting pole is mounted to the main board, the positioning cylinder is mounted on an opposite top end of the supporting pole, the block is mounted in a cavity of the positioning cylinder and is mounted on the top end of the supporting pole, and the second elastic member is mounted between the positioning cylinder and the main board.

15. A testing mechanism for testing for a sufficiency of a casing, the testing mechanism comprising:
a framework having a top surface configured for supporting the casing; and
a testing module including:
a main board slidably mounted to the framework;
at least one testing pin, a bottom end of the testing pin being slidably mounted on the main board, a top end of the testing pin being adjacent to the top surface of the framework, and the at least one testing pin configured for receipt in at least one corresponding mounting hole of a sufficient casing; and
at least one positioning module, the positioning module including a supporting pole, a positioning cylinder, a second elastic member, and a block, a bottom end of the supporting pole mounted to the main board, the positioning cylinder mounted on an opposite top end of the supporting pole, the block mounted in a cavity of the positioning cylinder and mounted on the top end of the supporting pole, and the second elastic member mounted between the positioning cylinder and the main board.

* * * * *